United States Patent
Mizuno et al.

(10) Patent No.: US 8,925,020 B2
(45) Date of Patent: Dec. 30, 2014

(54) TRANSMISSION SYSTEM, REPRODUCTION DEVICE, TRANSMISSION METHOD, AND PROGRAM

(75) Inventors: Chikara Mizuno, Tochigi (JP); Naoki Saito, Chiba (JP)

(73) Assignee: Sony Corporation (JP)

( * ) Notice: Subject to any disclaimer, the term of this patent is extended or adjusted under 35 U.S.C. 154(b) by 405 days.

(21) Appl. No.: 12/806,152

(22) Filed: Aug. 6, 2010

(65) Prior Publication Data

US 2011/0055878 A1   Mar. 3, 2011

(30) Foreign Application Priority Data

Aug. 24, 2009   (JP) ................................ P2009-193426

(51) Int. Cl.

| | | |
|---|---|---|
| H04N 7/18 | (2006.01) | |
| H04N 7/173 | (2011.01) | |
| H04N 21/472 | (2011.01) | |
| H04L 12/413 | (2006.01) | |
| H04N 21/433 | (2011.01) | |
| H04N 21/4788 | (2011.01) | |
| H04N 21/63 | (2011.01) | |

(52) U.S. Cl.
CPC ......... *H04N 7/17318* (2013.01); *H04N 21/472* (2013.01); *H04L 12/413* (2013.01); *H04N 21/4331* (2013.01); *H04N 21/4788* (2013.01); *H04N 21/4332* (2013.01); *H04N 21/632* (2013.01)
USPC .............................................. 725/80; 725/85

(58) Field of Classification Search
USPC ......................................... 725/74, 78, 80, 85
See application file for complete search history.

(56) References Cited

U.S. PATENT DOCUMENTS

| | | | | |
|---|---|---|---|---|
| 7,516,470 | B2 * | 4/2009 | Russ et al. | 725/48 |
| 7,865,918 | B2 * | 1/2011 | Tsukamoto | 725/36 |
| 7,954,133 | B2 * | 5/2011 | Stavenow et al. | 725/141 |
| 8,121,706 | B2 * | 2/2012 | Morikawa | 700/2 |
| 8,132,217 | B2 * | 3/2012 | Miyata | 725/78 |
| 8,266,657 | B2 * | 9/2012 | Margulis | 725/81 |
| 8,504,672 | B2 * | 8/2013 | Schmidt et al. | 709/223 |
| 8,527,640 | B2 * | 9/2013 | Reisman | 709/228 |
| 2006/0184972 | A1 * | 8/2006 | Rafey et al. | 725/80 |
| 2007/0250900 | A1 * | 10/2007 | Marcuvitz | 725/141 |
| 2011/0106962 | A1 * | 5/2011 | Cook et al. | 709/231 |

FOREIGN PATENT DOCUMENTS

| | | | |
|---|---|---|---|
| JP | 2007-306052 A | | 11/2007 |
| JP | 2007306052 A | * | 11/2007 |

* cited by examiner

*Primary Examiner* — James R Sheleheda
(74) *Attorney, Agent, or Firm* — Lerner, David, Littenberg, Krumholz & Mentlik, LLP

(57) ABSTRACT

There is provided a transmission system where reproduction devices and display devices may communicate content through a network, includes: a display device storage unit which stores identification information of the display devices capable of communicating a signal using communication means different from the network; and a content list storage unit which stores content lists provided from the reproduction device; the display device includes: a reproduction device storage unit which stores identification information of the reproduction devices capable of communicating a signal using the communication means; and when the display device which displays a requested content list is determined to be a device capable of transmission and reception using the communication means, based on at least one of the reproduction device identification information and the display device identification information, the reproduction device transmits the content lists stored in the content list storage unit to the display device.

11 Claims, 12 Drawing Sheets

FIG. 3

| DMS THAT MAY BE USED OVER LAN (23a) | CONTENT LIST (23b) | HDMI CONNECTION STATUS (23c) |
|---|---|---|
| DMS1 | BD-ROM<br>VIDEO3<br>MUSIC1<br>PHOTOGRAPH1 | CONNECTED |
| DMS2 | VIDEO1<br>VIDEO2 | NOT CONNECTED |
| ⋮ | ⋮ | ⋮ |

FIG. 5

| DMP THAT MAY BE USED OVER LAN | HDMI CONNECTION STATUS |
|---|---|
| DMP1 | CONNECTED |
| DMP2 | NOT CONNECTED |
| ⋮ | ⋮ |

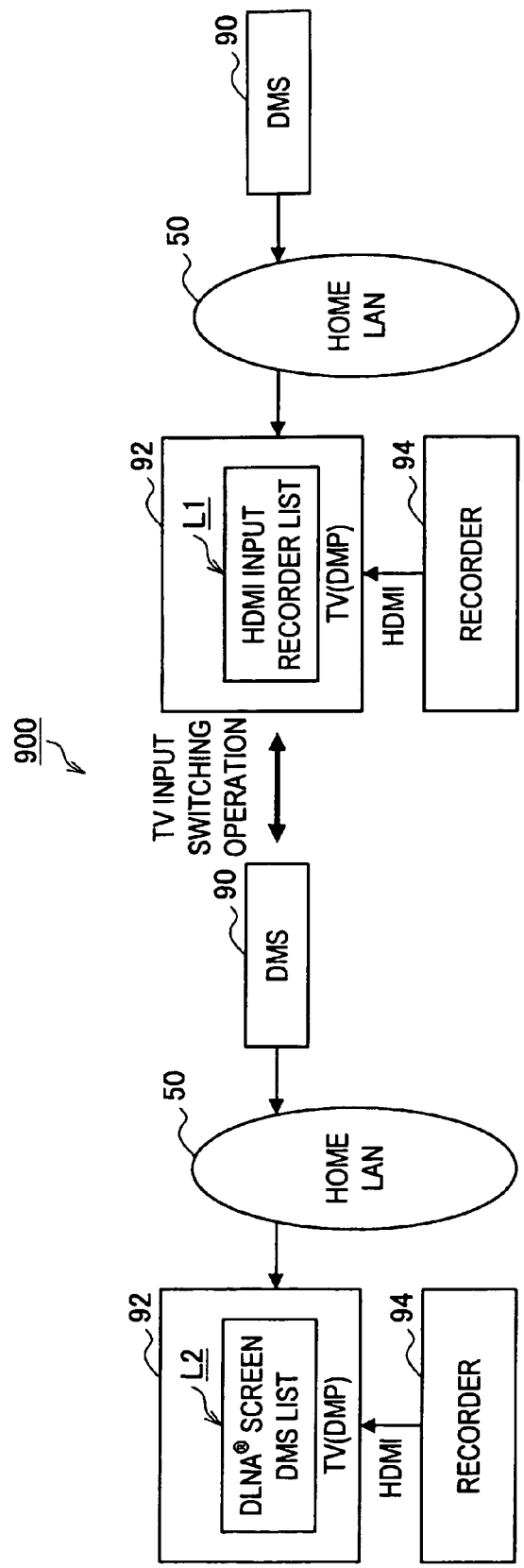

TRANSMISSION SYSTEM, REPRODUCTION DEVICE, TRANSMISSION METHOD, AND PROGRAM

CROSS-REFERENCE TO RELATED APPLICATION

The present application claims priority from Japanese Patent Application No. JP 2009-193426 filed in the Japanese Patent Office on Aug. 24, 2009, the entire content of which is incorporated herein by reference.

BACKGROUND OF THE INVENTION

1. Field of the Invention

The present invention relates to a transmission system, a reproduction device, a transmission method, and a program. More specifically, the invention relates to a transmission system, a reproduction device, a transmission method, and a program using two systems of communication means.

2. Description of the Related Art

In recent years, communication between devices using a home network (home LAN (Local Area Network)) in particular has been standardized, based on digital living network alliance (DLNA: registered trademark) technical specifications. Further, communication based on high-definition multimedia interface (HDMI) has been standardized. A transmission system which uses these two systems of communication means has also been developed (refer to Japanese Patent Application JP 2007-306052, for example).

According to the DLNA technical specifications, a display device including a digital media player (DMP) function and a reproduction device including a digital media server (DMS) function are connected to the home LAN or the like, for example. Hereinafter, the display device including the DMP function is referred to as the display device (DMP), while the reproduction device including the DMS function is referred to as the reproduction device (DMS).

In addition to the connection to the home LAN, the display device and the reproduction device are connected using an HDMI cable. In the display device and the reproduction device, video, audio, and control signals are transmitted and received through one HDMI cable, which is a transmission line different from the home network.

SUMMARY OF THE INVENTION

In this transmission system, however, in order to display a content list of the reproduction device HDMI-connected to the display device, it is necessary to switch connection of an input of the display device to HDMI connection by an operation on the body of the display device or a remote operation on the display device.

Further, in order to display a list of contents which may be reproduced by the reproduction device (DMS) on the display device (DMP) based on the DLNA technical specifications, a DLNA content list screen needs to be displayed by an operation on the body of the display device or a remote operation on the display device.

Accordingly, it may be impossible for a user to simultaneously display the content list of the HDMI-connected reproduction device and the content list of the network-connected reproduction device (DMS). For this reason, the user must repeat complicated operations such as input switching or display of the list in order to check the content lists of all the reproduction devices connected to the display device.

On contrast therewith, content list information may be transmitted over the HDMI from the HDMI-connected reproduction device, and may be integrated into the DLNA content list on the display device, for display. However, CEC (Consumer Electronics Control) used for device control based on the HDMI standard provides a low-speed interface. Accordingly, assuming that the number of contents is several hundreds, it takes a considerable time to transmit a list of the contents. Thus, this method is not realistic.

When the HDMI-connected reproduction device includes the DMS function, the HDMI-connected reproduction device may also be network-connected. Then, the content list of the HDMI-connected reproduction device may be thereby integrated into content lists of other reproduction devices including the DMS function and a list of the content lists may be displayed in the form of a DLNA content list, based on the DLNA technical specifications. In this case, however, when contents that cannot be sent to the network based on the DLNA technical specifications are present, those contents may not be included in the content list of a reproduction device (DMS) in response to a content list acquisition request from the display device (DMP). In a currently commercially available Blu-ray Disc recorder, for example, content recorded on an optical disk or music content may not be sent out to the network, based on the DLNA technical specifications. Such a recorder does not include in its content list the content which is not sent out to the network.

Even if the content that cannot be sent out to the network is included in the content list, it is necessary to switch connection of an input of the display device to the HDMI connection and then reproduce the content stored in the reproduction device when the content is reproduced.

Even if the content can be sent out to the network based on the DLNA technical specifications, the content may not be able to be displayed due to a limitation on reproduction capability or reproduction function of the display device (DMP). When the display device including the DMP function does not conform to the digital transmission content protection over Internet protocol (DTCP-IP), copyright-protected digital broadcasting contents cannot be displayed. For this reason, when a list of contents is displayed, those contents are not displayed or displayed in an inactive state. Further, when an H. 264/AVC stream cannot be decoded, broadcasting content encoded according to the H. 264/AVC system or AVCHD content cannot be displayed. In such a case as well, connection of an input of the display device needs to be switched to the HDMI connection, and content recorded in the reproduction device needs to be reproduced.

In view of the above-mentioned problems, the present invention provides a transmission system, a reproduction device, a transmission method, and a program capable of performing list display of all content lists including contents which may be reproduced by the reproduction device, irrespective of a content transmission path. Such content lists are displayed on a display device in the transmission system.

According to an embodiment of the present invention, there is provided a transmission system where reproduction devices and display devices may mutually transmit and receive content through a network, each reproduction device reproducing the content, each display device displaying the content, wherein the reproduction device includes: a display device storage unit which stores identification information of the display devices capable of transmitting and receiving a signal using communication means different from the network; and a content list storage unit which stores content lists provided from the reproduction device; the display device includes: a reproduction device storage unit which stores identification information of the reproduction devices capable of transmitting and receiving a signal using the communication means; and when the display device which displays a content list requested by a user is determined to be a device capable of transmission and reception using the communication means, based on at least one of the reproduction device identification information stored in the display device storage unit and the display device identification information stored in the reproduction device storage unit, the reproduction device transmits the content lists stored in the content list storage unit to the display device.

With this arrangement, when it is determined that the communication means such as the HDMI can be used according to association between the display device identification information and the reproduction device identification information stored in predetermined storage regions, list display of all the content lists stored in the content list storage region of the reproduction device may be performed. This allows the user to readily select content requested for reproduction.

The communication means may transmit and may receive the signal using an HDMI cable different from the network, based on a high-definition multimedia interface HDMI standard.

When the display device that displays the content list requested by the user is determined not to be the device capable of transmission and reception using the communication means, based on at least one of the reproduction device identification information stored in the display device storage unit and the display device identification information stored in the reproduction device storage unit, the reproduction device may extract one or more content lists capable of being sent out to the network from the content lists stored in the content list storage unit., and may transmit to the display device.

When the display device which displays content selected by the user is determined to be the device capable of transmission and reception using the communication means, an input of the display device may be automatically switched, and the reproduction device may reproduce the selected content and may display the selected content on the display device, using the communication means.

When the display device which displays the content selected by the user is determined not to be the device capable of transmission and reception using the communication means, the reproduction device may send out the selected content to the network.

When the reproduction device which reproduces content selected by the user is determined to be the device capable of transmission and reception using the communication means, an input of the display device may be automatically switched, and the display device may request reproduction of the selected content to the reproduction device.

When the reproduction device which reproduces the content selected by the user is determined not to be the device capable of transmission and reception using the communication means, the display device may send out a request for reproduction of the selected content to the network.

The reproduction device may output the selected content in response to a request for reproduction of the selected content; and when the reproduction device is determined to be the device capable of transmission and reception using the communication means, the display device may display the output content while receiving the output content through the communication means, and when the reproduction device is determined not to be the device capable of transmission and reception using the communication means, the display device may receive the output content through the network, may convert the output content by a predetermined data conversion, and may display the converted output content.

According to another embodiment of the present invention, there is provided a reproduction device for reproducing content, the reproduction device being capable of performing transmission and reception with display devices each of which displays the content through a network, the reproduction device which includes a display device storage unit which stores identification information of the display devices capable of transmitting and receiving a signal using communication means different from the network; and a content list storage unit which stores content lists provided from the reproduction device; and wherein when the display device that displays a content list requested by a user is determined to be a device capable of transmission and reception using the communication means, based on the reproduction device identification information stored in the display device storage unit, the reproduction device transmits the content lists stored in the content list storage unit to the display device.

According to another embodiment of the present invention, there is provided a transmission method in which reproduction devices and display devices mutually transmit and receive content through a network, each reproduction device reproducing the content, each display device displaying the content, the transmission method which includes the steps of: storing identification information of the display devices capable of transmitting and receiving a signal using communication means different from the network; storing content lists provided from the reproduction device in a content list storage unit; storing identification information on one or more of the reproduction devices capable of transmitting and receiving the signal using the communication means; and transmitting the content lists stored in the content list storage unit to the display device when the display device which displays a content list requested by a user is determined to be a device capable of transmission and reception using the communication means, based on at least one of the reproduction device identification information stored in the display device storage unit and the display device identification information stored in the reproduction device storage unit.

According to another embodiment of the present invention, there is provided a program for a transmission method in which reproduction devices and display devices mutually transmit and receive content through a network, each reproduction device reproducing the content, each display device displaying the content, the program causing a computer to execute which includes the processes of: storing identification information of the display devices capable of transmitting and receiving a signal using communication means different from the network; storing content lists provided from the reproduction device in a content list storage unit; storing identification information on one or more of the reproduction devices capable of transmitting and receiving the signal using the communication means; and transmitting the content lists stored in the content list storage unit to the display device when the display device which displays a content list requested by a user is determined to be a device capable of transmission and reception using the communication means, based on at least one of the reproduction device identification information stored in the display device storage unit and the display device identification information stored in the reproduction device storage unit.

As described above, according to the present invention, the reproduction device may perform list display of all the content lists capable of being reproduced by the reproduction device, on the display device, irrespective of a content transmission path.

BRIEF DESCRIPTION OF THE DRAWINGS

FIG. 3 is a table for explaining an example of information stored in the display device in the first embodiment;

FIG. 5 is a table for explaining an example of information stored in the reproduction device in the first embodiment;

FIG. 12 is a diagram for explaining a related art transmission system.

DETAILED DESCRIPTION OF THE EMBODIMENTS

Figure 1:
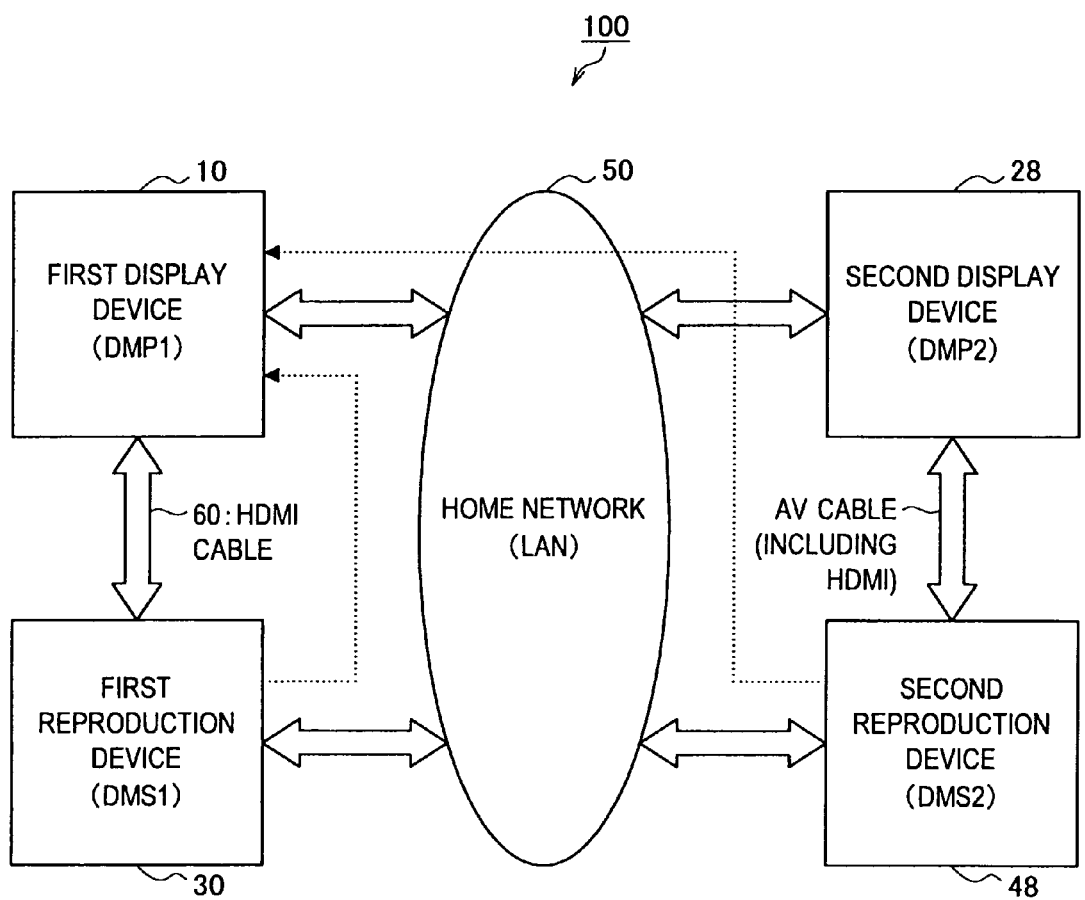
FIG. 1 is a diagram showing an overall configuration of a transmission system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<First Embodiment>
[Overall Configuration of Transmission System]
 (DLNA)
 (HDMI)
 [LIST Display of Content Lists and Input Switching]
 [Internal Configuration of Display Device (DMP)]
 [Internal Configuration of Reproduction Device (DMS)]
 [Operation of Reproduction Device (DMS)]
 [Operation of Display Device (DMP)]
<Second Embodiment>
 [Internal Configuration of Display Device (DMP)]
 [Operation of Display Device (DMP)]
 [Operation of Reproduction Device (DMS)]

[First Embodiment]
[Overall Configuration of Transmission System]

First, an overall configuration of a transmission system according to a first embodiment of the present invention will be described with reference to FIG. 1. In a transmission system 100 in the first embodiment, a plurality of display devices and a plurality of reproduction devices may be connected by two systems of communication means which are transmission lines of a LAN (home network) 50 and transmission lines of cables (HDMI cable 60 and AV cable)

Specifically, a first display device 10, a second display device 28, a first reproduction device 30, and a second reproduction device 48 are mutually connected using the LAN 50. The first display device 10 and the first reproduction device 30 are connected using the HDMI cable 60, in addition to the LAN 50. The second display device 28 and the second reproduction device 48 are connected using the AV cable (including an HDMI cable), in addition to the LAN 50.

(DLNA)

The first display device 10, second display device 28, first reproduction device 30, and second reproduction device 48 may transmit and receive content using the LAN 50, based on digital living network alliance (DLNA) technical specifications. The DLNA technical specifications define a reproduction device including a digital media server (DMS) function of recording and reproducing content and a display device including a digital media player (DMP) function of displaying the content reproduced by the reproduction device. Both of the reproduction device (DMS) and the display device (DMP) may be used just by being connected to the LAN 50. The display device (DMP) may find out the reproduction device (DMS) connected to the display device (DMP) through the LAN 50, and may automatically acquire a list of content lists. A user selects content which he desires to reproduce from among the list of content lists displayed on the display device (DMP). With this arrangement, selected content is automatically provided from the reproduction device (DMS) to the display device (DMP).

(HDMI)

The first display device 10 and the first reproduction device 30 may also transmit and receive content using the HDMI cable 60, based on the high-definition multimedia interface (HDMI) standard. The HDMI standard is one of input/output interface standards mainly for digital video signals and audio signals for home appliances and AV devices. One HDMI cable 60 may simultaneously transmit and receive signals including a video signal and a control signal.

As one of cooperations between the display device and the reproduction device based on high-definition multimedia interface-consumer electronics control (HDMI-CEC), there is a command of one touch play (OTP: One Touch Play). The one touch play is a function by which, in conjunction with a reproduction button of a reproduction device, a display device connected to the reproduction device in a power-off state automatically turns on, and automatic switching of an input of the reproduction device is implemented, for example. With this function, the user should just carry out a one-touch operation of inserting a disk into the reproduction device and depressing the reproduction button to perform reproduction. The need for an operation of turning on the display device and switching of an input of the display device is thereby eliminated.

Through the LAN 50, video data and audio data are compressed by the MPEG 2 method, for example, and are transmitted. On the other hand, noncompressed video data are transmitted on a pixel-by-pixel basis through the HDMI cable 60. At the time of the transmission, audio data and control data are simultaneously transmitted.

The first display device 10 and the second display device 28 correspond to a display device which displays content. A television, an AV device, a personal computer, or the like, for example, may be pointed out as each of the first display device 10 and the second display device 28.

The first reproduction device 30 and the second reproduction device 48 correspond to a reproduction device which reproduces content. A digital versatile disc (DVD) player included in an HDD, a Blu-ray recorder, a home server, a personal computer, or the like, for example, may be pointed out as each of the first reproduction device 30 and the second reproduction device 48.

The LAN 50 is an example of a network which transmits and receives content between display and reproduction devices, based on the DLNA specifications. Ethernet (trademark), for example, may be used as the LAN 50. The LAN 50 may be wired or wireless.

[List Display of Content Lists and Input Switching]

Before describing internal configurations and operations of the respective devices which constitute the above-mentioned transmission system 100, list display of content lists and input switching in a related art transmission system using two systems will be briefly described with reference to FIG. 12.

As shown in FIG. 12, a content list stored in a DMS 90 and a content list in a recorder 94 which is HDMI-connected to a DMP 92 of a television or the like, for example, cannot be simultaneously displayed. For this reason, the user first needs to perform an input switching operation for the television (display device). When switching of an input of an HDMI transmission line is made, for example, a content list L1 in the recorder 94 received through an HDMI is displayed on the DMP 92. When switching of the input of a DLNA transmission line is made, a content list L2 in the DMS 90 received through the home LAN 50 is displayed on the DMP 92. As described above, the user cannot simultaneously view both of the content lists L1 and L2 in the related art transmission system 900. Further, an input switching operation for the display device of the television or the like is necessary in order to view both of the content lists.

On the other hand, in the transmission system 100 in the first embodiment and a second embodiment, a list of content lists that may be viewed and listened to may be simultaneously displayed on the display device without performing the input switching operation that has been necessary so far. Internal configurations of the respective devices which constitute the transmission system 100 in order to achieve the above-mentioned effects will be described below. Then, operations of the respective devices will be described.

[Internal Configuration of Display Device (DMP)]

First, an internal configuration of the first display device 10 as the display device (DMP) in the first embodiment will be described below with reference to FIG. 2.

The first display device 10 includes an HDMI terminal 11, an HDMI/CEC processing unit 12, an HDMI/CEC control unit 13, a network terminal 14, a network processing unit 15, a network control unit 16, a control unit 17, a content reproduction unit 18, a video display processing unit 19, a display panel 20, an audio processing unit 21, a loudspeaker 22, a DMS and network content storage unit 23.

The HDMI/CEC processing unit 12, HDMI/CEC control unit 13, network processing unit 15, network control unit 16, control unit 17, content reproduction unit 18, video display processing unit 19, audio processing unit 21, and DMS and network content storage unit 23 are connected through a bus 25.

The HDMI terminal 11 and the HDMI/CEC processing unit 12 are connected through the HDMI cable 60. The HDMI terminal 11 is a terminal for receiving video data, audio data, and control data. The HDMI/CEC processing unit 12 performs input processing of the video data and the audio data supplied through the HDMI terminal 11.

The HDMI/CEC control unit 13 controls the processing which is executed by the HDMI/CEC processing unit 12 so that the processing conforms to the HDMI standard. In the one touch play, for example, the HDMI/CEC control unit 13 performs control so that, in conjunction with the reproduction button of the reproduction device, the first display device 10 in the power-off state automatically turns on and automatic switching of an input of the HDMI cable 60 is made. In response to this control, the HDMI/CEC processing unit 12 performs the input processing of the video data and the audio data supplied through the HDMI terminal 11.

The network terminal 14 and the network processing unit 15 are connected through the LAN 50. The network terminal 14 is a terminal for connecting to the LAN 50. The network processing unit 15 receives video data or the like received through the network terminal 14 and performs desired processing. The network control unit 16 controls the processing of the network processing unit 15 so that the processing conforms to the DLNA specifications. The control unit 17 controls overall operations of the first display device 10 such as transmission line communication using the HDMI terminal 11 and transmission line communication using the network terminal 14.

The content reproduction unit 18 converts the video data and audio data received through the network terminal 14 and then processed by the network processing unit 15 to data which may be reproduced by the first display device 10.

The video display processing unit 19 processes the video data obtained by conversion by the content reproduction unit 18 for display, and displays the processed video data on the display panel 20. The video display processing unit 19 processes the video data received through the HDMI terminal 11, which is not compressed, for display, and displays the processed uncompressed video data on the display panel 20. A liquid crystal display (LCD: Liquid Crystal Display) or the like, for example, may be used as the display panel 20.

The audio processing unit 21 performs audio processing on the audio data obtained by conversion by the content reproduction unit 18 and analog-converts the audio data. Then, the audio processing unit 21 amplifies the analog-converted audio data and outputs the amplified audio data through the loudspeaker 22. The audio processing unit 21 performs audio processing on the audio data received through the HDMI terminal 11, which is not compressed, and analog-converts the uncompressed audio data. Then, the audio processing unit 21 amplifies the analog-converted audio data and outputs the amplified audio data through the loudspeaker 22.

As shown in FIG. 3, the DMS and network content storage unit 23 includes a list display 23*a* of DMSs which may be used over the LAN, a content list 23*b* obtained from each DMS, and a connection status 23*c* indicating which DMS is HDMI-connected to the first display device 10. A DMS1 of the DMSs which may be used over the LAN, for example, includes a content list of a BD-ROM, a video 3, music 1, and a photograph 1, and is HDMI-connected to the first display device 10. On the other hand, a DMS2 includes a content list of a video 1 and a video 2, and is not HDMI-connected to the first display device 10.

As described above, identification information on one or more of the DMSs (reproduction devices) which may transmit and receive a signal of video data or the like using the HDMI is stored in the display device according to this embodiment. By performing list display of the DMSs on the display panel 20 of the first display device 10 to select an HDMI-connected device from among the DMSs, for example, the DMS (reproduction device) may be associated with the DMP (display device) which is HDMI-connected.

Alternatively, when the first reproduction device 30 is connected to the LAN 50, the first reproduction device 30 transmits network information capable of identifying the first reproduction device 30 over the LAN 50 to the first display device 10 using a vendor specific command of CEC or the like. With this arrangement, the HDMI-connected reproduction device being the first reproduction device 30 may be notified to the first display device 10, and the first display device 10 may be thereby associated with the first reproduction device 30.

The DMS and network content storage unit 23 is an example of a reproduction device storage unit which stores identification information on one or more of reproduction devices connected to the transmission system 100, which may transmit and receive signals including a video signal, using the HDMI cable 60. The HDMI cable 60 is different communication means from the LAN 50. The reproduction device storage unit should only include identification information on one or more of the DMSs capable of being HDMI-connected to the first display device 10, and does not necessarily store a content list.

[Internal Configuration of Reproduction Device (DMS)]

Next, an internal configuration of the first reproduction device 30 will be described with reference to FIG. 4, as the reproduction device (DMS) in the first embodiment.

The first reproduction device 30 includes an HDMI terminal 31, an HDMI/CEC processing unit 32, an HDMI/CEC control unit 33, a network terminal 34, a network processing unit 35, a network control unit 36, a control unit 37, a content reproduction unit 38, an available DMP storage unit 39, a content list storage unit 40, and a content storage unit 41.

The HDMI/CEC processing unit 32, HDMI/CEC control unit 33, network processing unit 35, network control unit 36, control unit 37, content reproduction unit 38, available DMP storage unit 39, content list storage unit 40, and content storage unit 41 are connected through a bus 45.

The HDMI terminal 31 and the HDMI/CEC processing unit 32 are connected through the HDMI cable 60. The HDMI terminal 31 is a terminal for outputting video data, audio data, and control data. The HDMI/CEC processing unit 32 performs output processing on the video data and the audio data to be output to the HDMI terminal 31.

The HDMI/CEC control unit 33 controls the HDMI/CEC processing unit 32 so that the processing conforms to the HDMI standard. The HDMI/CEC control unit 33 controls the HDMI/CEC processing unit 32 so that, in conjunction with the reproduction button of the reproduction device, the one touch play (OTP) command is transmitted to the first display device 10, for example.

The network terminal 34 and the network processing unit 35 are connected through the LAN 50. The network terminal 34 is a terminal for connecting to the LAN 50. The network processing unit 35 processes video data or the like that will be transmitted from the network terminal 34. The network control unit 36 controls processing of the network processing unit 35 so that the processing conforms to the DLNA specifications.

The control unit 37 controls overall operation of the first reproduction device 30 such as transmission line communication using the HDMI terminal 31 and transmission line communication using the network terminal 34. Assume that the first display device 10 which displays a content list requested by the user is determined to be a device capable of transmission and reception using the HDMI cable 60 from at least one of the identification information on the one or more of the reproduction devices (HDMI-connectable DMSs shown in FIG. 3) stored in the DMS and network content storage unit 23 and the identification information on one or more of the display devices (HDMI-connectable DMPs shown in FIG. 5) stored in the available DMP storage unit 39, for example. Then, the control unit 37 transmits content lists stored in the content list storage unit 40 to the first display device 10.

When the first display device 10 that displays content selected by the user is determined to be a device capable of transmission and reception using the HDMI cable 60 in a similar manner, the control unit 37 automatically switches an input of the first display device 10, reproduces the content selected by the user, and causes the content to be displayed on the first display device 10, using the HDMI cable 60.

On the other hand, assume that the first display device 10 which displays the content list requested by the user is determined not to be a device capable of transmission and reception using the HDMI cable 60 from at least one of the reproduction device identification information stored in the DMS and network content storage unit 23 and the display device identification information stored in the available DMP storage unit 39. Then, the control unit 37 extracts only a content list which may be transmitted to the LAN 50 from among the content lists stored in the content list storage unit 40.

When the first display device 10 that displays the content selected by the user is determined not to be a device capable of transmission and reception using the HDMI cable 60 in the similar manner, the control unit 37 transmits the content selected by the user to the LAN 50.

The content reproduction unit 38 performs data processing so that contents stored in the content storage unit 41 may be transmitted to the HDMI cable 60 through the HDMI terminal 31.

As shown in FIG. 5, the available DMP storage unit 39 includes a list display 39a of DMPs which may be used over the LAN 39a, and a connection status 39b indicating which DMP is HDMI-connected to the first reproduction device 30. A DMP1 of the DMPs which may be used over the LAN, for example, is HDMI-connected to the first reproduction device 30. On the other hand, a DMP2 is not HDMI-connected to the first display device 30. The available DMP storage unit 39 corresponds to a display device storage unit which stores the identification information on one of more of the display devices capable of transmitting or receiving a signal using the HDMI cable 60.

The content list storage unit 40 stores the content lists provided from the first reproduction device 30. Herein, the content lists provided from the first reproduction device 30 are the BD-ROM, video 3, music 1, and photograph 1, as shown in FIG. 3.

The content storage unit 41 stores the contents provided from the first reproduction device 30. Herein, the contents provided from the first reproduction unit 30 are contents of the BD-ROM, video 3, music 1, and photograph 1.

As described above, the identification information on the one or more the DMPs (display devices) capable of transmitting or receiving a signal indicative of video data or the like using the HDMI is stored in the reproduction device in this embodiment. By performing list display of the DMPs which may be used by the first reproduction device 30 to select an HDMI-connected device from among the DMPs, for example, the DMP (display device) may be associated with the DMS (reproduction device) that is HDMI-connected.

Alternatively, when the first reproduction device 10 is connected to the LAN 50, the first display device 10 transmits network information capable of identifying the first display device 10 over the LAN 50 to the first reproduction device 30 using the vendor specific command of CEC or the like. With this arrangement, the HDMI-connected display device being the first display device 10 may be notified to the first reproduction device 30, and the first display device 10 may be thereby associated with the first reproduction device 30.

Actually, functions of the control unit 17 of the first display device 10 and the control unit 37 of the first reproduction device 30 are executed by a CPU not shown which executes a dedicated control device or program. The program which is executed by the CPU is stored in desired memories. By reading each program from these respective memories and executing the program by the CPU, the functions of the respective units are implemented.

[Operation of Reproduction Unit (DMS)]

Next, an operation of the first reproduction device 30 as the reproduction device (DMS) in the first embodiment will be described, with reference to a flowchart shown in FIG. 6. The operation of the first reproduction device 30 is started from step S600. Then, the operation proceeds to step S605. The first reproduction device 30 determines whether or not a content list acquisition request has been made from the network (LAN 50) connected to the first reproduction device 30. When it is determined that the content list acquisition request has been made, the first reproduction device 30 determines whether or not a display device of an acquisition request source is an HDMI-connected device in step S610.

Whether or not the display device of the acquisition request source is the HDMI-connected device is determined according to the HDMI-connection status of each DMP (refer to FIG. 5) stored in the available DMP storage unit 39 of the first reproduction device 30. Alternatively, whether or not the display device of the acquisition request source is the HDMI-connected device may also be determined by inquiring each display device about the HDMI-connection status (refer to FIG. 3) from the first reproduction device 30 and then being notified of the HDMI-connection status.

When it is determined that the display device of the acquisition request source is the HDMI-connected device, the operation proceeds to step S615, and the first reproduction device 30 transmits all content lists. On the other hand, when it is determined that the display device of the acquisition request source is not the HDMI-connected device, the operation proceeds to step S620, and the first reproduction device 30 transmits only the content list that may be sent out to the network (LAN 50).

When it is determined in step S605 that the content list acquisition request has not been made from the network (LAN 50), the first reproduction device 30 determines whether or not a content reproduction request has been made from the network, in step S625. When it is determined that the content reproduction request has been made, the first reproduction device 30 determines whether or not the display device of the reproduction request source is the HDMI-connected device, in step S630.

When it is determined that the display device of the reproduction request source is the HDMI-connected device, the first reproduction device 30 transmits the one touch play (OTP) command to the HDMI-connected device (HDMI/CEC) in step S635. Then, the first reproduction device 30 reproduces content which has been requested for reproduction in step S640, and outputs the reproduced content to the display device of the reproduction request source, which is the HDMI-connected device. On the other hand, when it is determined in step S630 that the display device of the reproduction request source is not the HDMI-connected device, the first reproduction device 30 outputs the content which has been requested for reproduction to the network (LAN 50).

[Operation of Display Device (DMP)]

Figure 7:
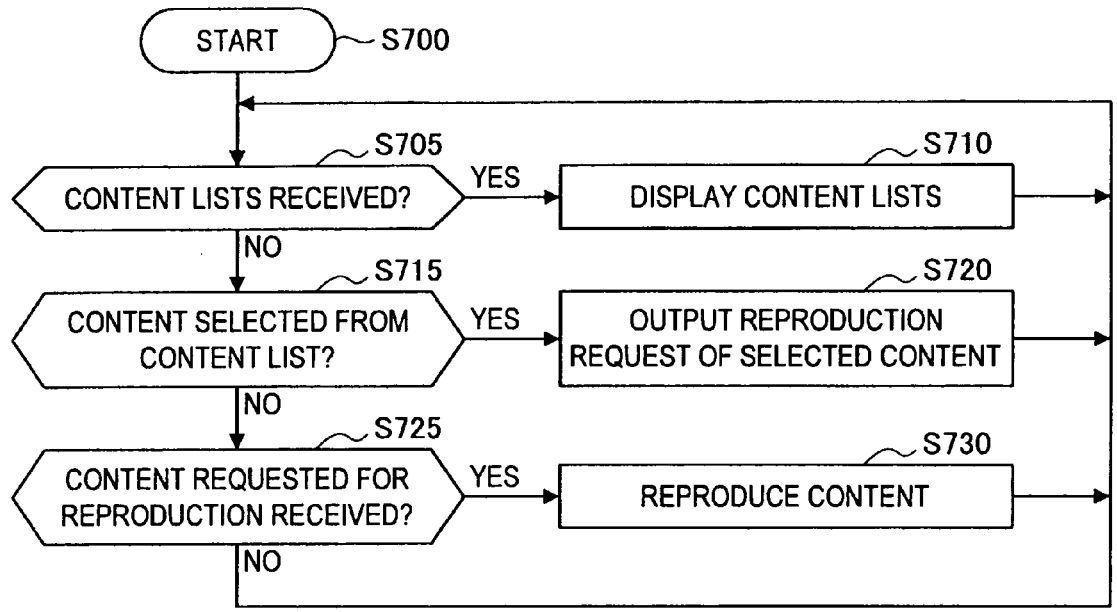
FIG. 7 is a flowchart showing processes of the display device in the first embodiment.

Next, an operation of the first display device 10 as the display device (DMP) in the first embodiment will be described with reference to a flowchart shown in FIG. 7.

The operation of the first display device 10 is started from step S700. The operation then proceeds to step S705, and it is determined whether or not the first display device 10 has received content lists. When it is determined that the first display device 10 has received the content lists, the first display device 10 displays the content lists on the display panel 20 in step S710.

When it is determined in step S705 that the first display device 10 has not received the content lists, the operation proceeds to step S715. Then, it is determined which one of contents has been selected from the content list for the first display device 10 by a user operation. When it is determined that the one of contents has been selected, the first display device 10 outputs a reproduction request of the selected content in step S720.

When it is determined in step S715 that the content has not been selected, it is determined in step S725 whether or not the first display device 10 has received content which has been requested for reproduction. When it is determined that the first display device 10 has received the content, the operation proceeds to step S730, and the first display device 10 reproduces the received content.

Figure 6:
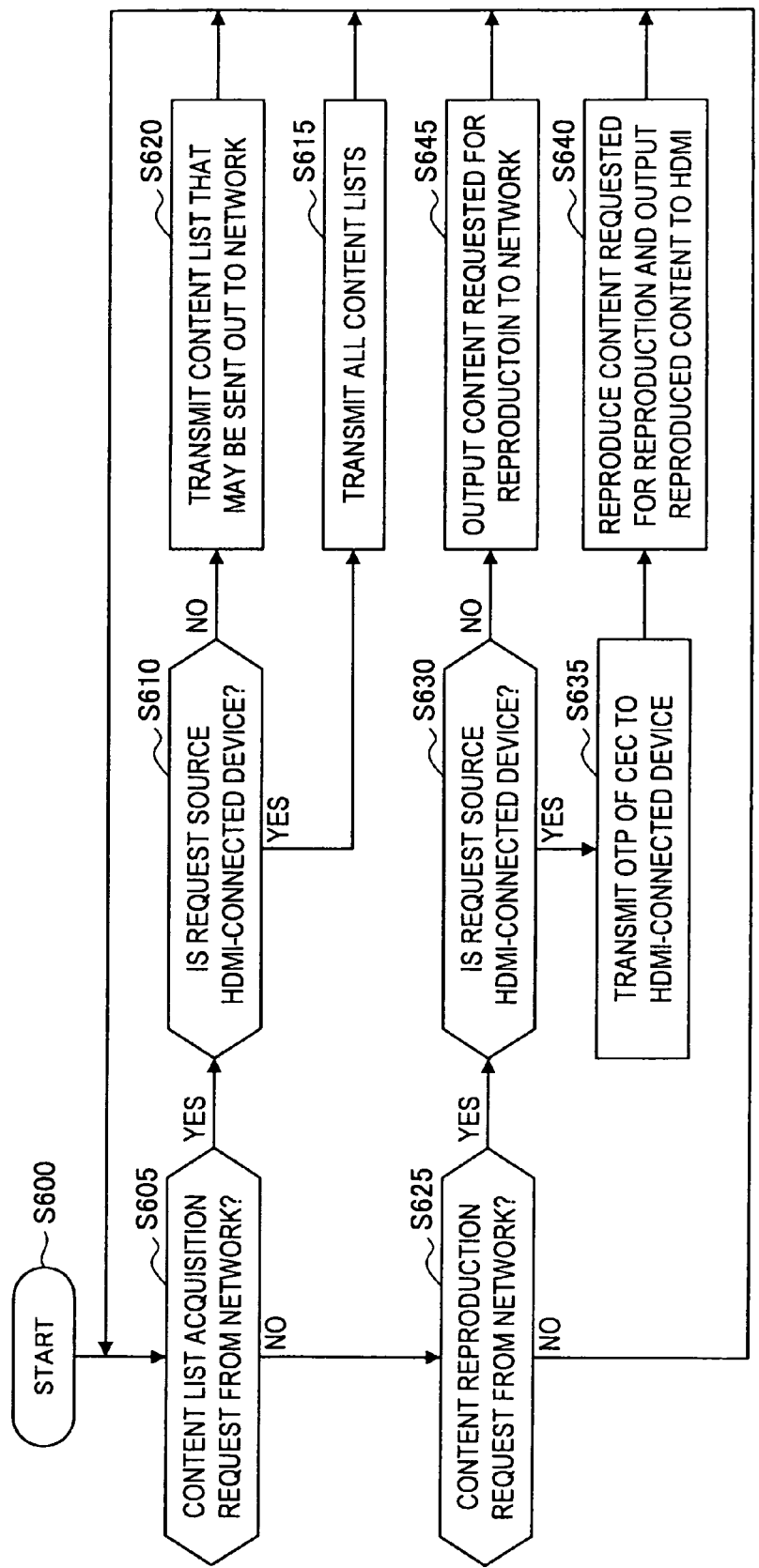
FIG. 6 is a flowchart showing processes of the reproduction device in the first embodiment.
Figure 8:
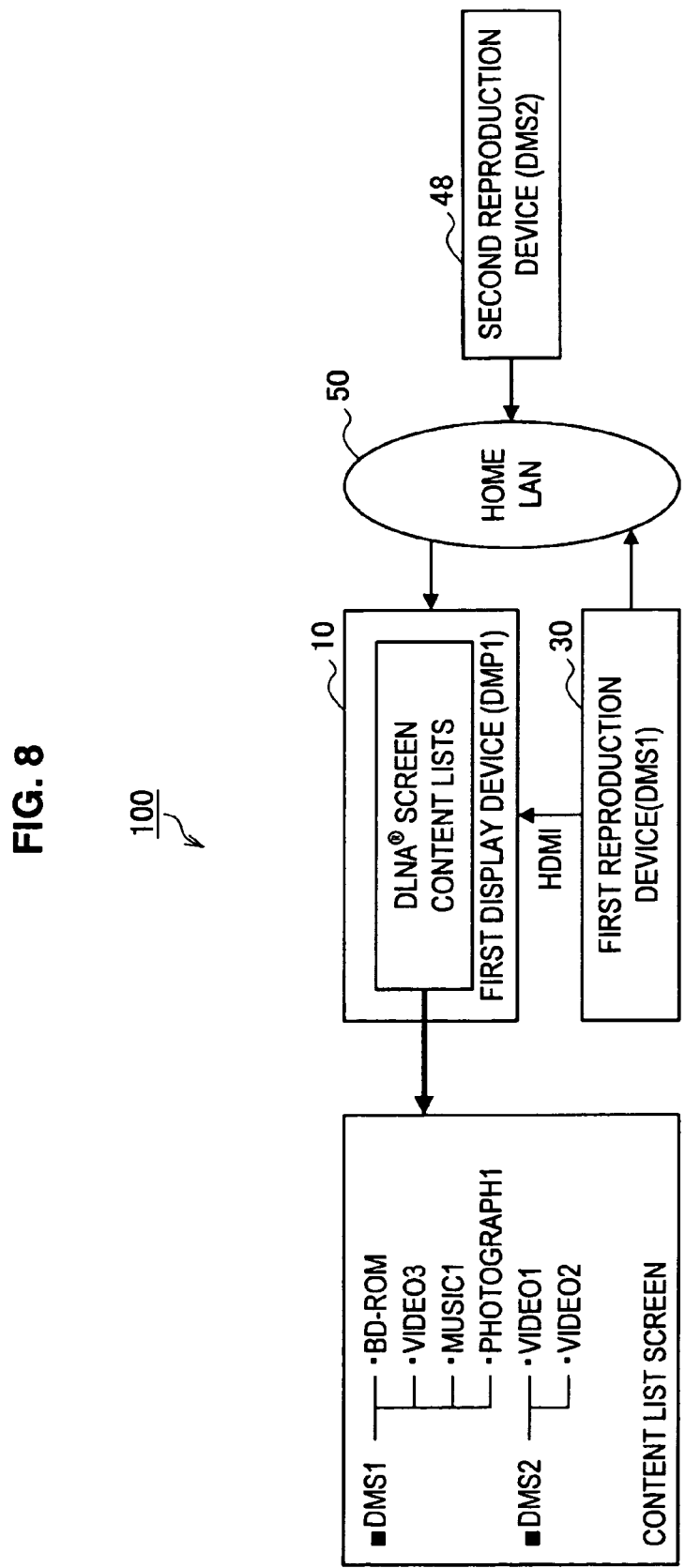
FIG. 8 is a diagram for explaining acquisition of content lists using a transmission system in the first embodiment.

As described above, according to the reproduction device and the display device in this embodiment, by executing the steps S605 to S620 in FIG. 6, list display of all content lists capable of being reproduced by the reproduction device which is HDMI-connected and network (LAN)-connected may be performed by a simple operation. In other words, referring to FIG. 8, assume that the first display device 10 (DMP1) has made a content list acquisition request to all the reproduction devices (DMS1, DMS2) connected to the LAN 50 so as to display a content list on the first display device 10 (DMP1). Since the first display device (DMP1) is the HDMI-connected device, the first reproduction device 30 (DMS1) transmits all the content lists stored in the first reproduction device 30 (DMS1) including content which cannot be sent out due to the DLNA specifications. On the other hand, since the first display device (DMP1) is not HDMI-connected to the second reproduction device 48 (DMS2), the second reproduction device 48 transmits among contents stored in the DMS2 only a list of contents capable of being sent out according to the DLNA specifications.

Figure 9:
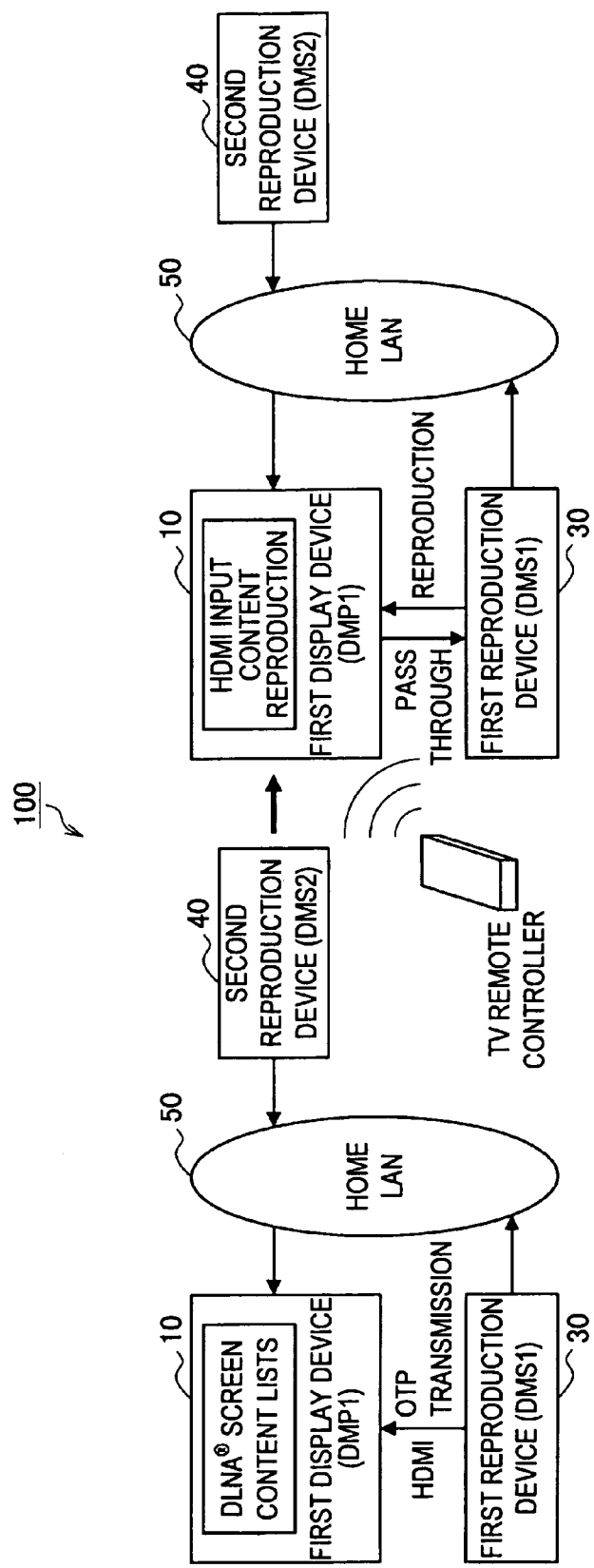
FIG. 9 is a diagram for explaining content reproduction using the transmission system in the first embodiment.

According to the reproduction device and the display device in this embodiment, by executing the processes in the steps S625 to S645 in FIG. 6, content may be reproduced without needing a special input switching operation and an operation on the reproduction device (refer to FIG. 9).

Figure 4:
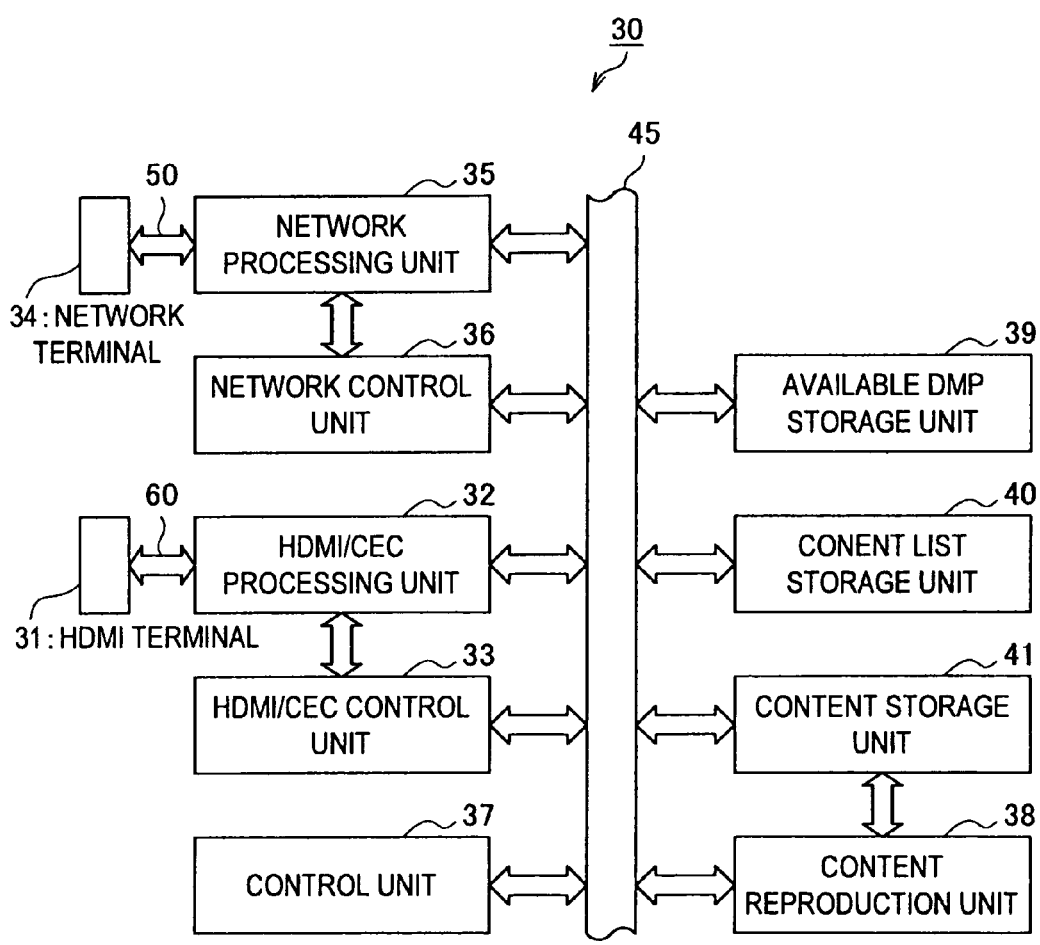
FIG. 4 is a diagram showing an internal configuration of a reproduction device (DMS) in the first embodiment.

When reproduction of content that has been requested for reproduction is started by the first reproduction device 30, the first reproduction device 30 sends the content from the content storage unit 41 in FIG. 4 to the HDMI terminal 31 through the content reproduction unit 38 and the HDMI/CEC processing unit 32, in HDMI transmission using the HDMI cable 60. The first display device 10 receives the sent content through the HDMI terminal 11 in FIG. 2. Among input data of the content, video data is displayed on the display panel 20 through the HDMI/CEC processing unit 12 and the video display processing unit 19, and audio data is output to the loudspeaker 22 through the audio processing unit 21.

On the other hand, in DLNA transmission using the LAN 50, the first reproduction device 30 sends content from the content storage unit 41 in FIG. 4 to the network terminal 34 through the network processing unit 35. The first display device 10 receives the sent content through the network terminal 14 in FIG. 2. Input data of the content is converted to data which may be reproduced by the content reproduction unit 18. Video data of the converted data is displayed on the display panel 20 through the video display processing unit 19, and audio data of the converted data is output to the loudspeaker 22 through the audio processing unit 21.

During reproduction of the content that has been requested for reproduction from the first display device 10, which is the HDMI-connected device, the first reproduction device 30 is subject to DLNA reproduction control from the first display device 10. Alternatively, the first reproduction device 30 is subject to reproduction control using an HDMI/CEC pass-through command from the first display device 10.

With no HDMI-connected device associated with the storage unit of one of the display device or the reproduction device, this embodiment does not function.

<Second Embodiment>

Next, a transmission system according to a second embodiment will be described. In the transmission system 100 in the first embodiment, the process for HDMI connection is carried out on the side of the reproduction device. On contrast therewith, in the transmission system 100 in the second embodiment, the process for HDMI connection is carried out on the side of the display device. Since configurations of the transmission system and the reproduction device are the same as those in the first embodiment, description of the transmission system and the reproduction device will be omitted. Herein, a configuration of the display device and an operation of each device will be described.

[Internal Configuration of Display Device (DMP)]

Figure 2:
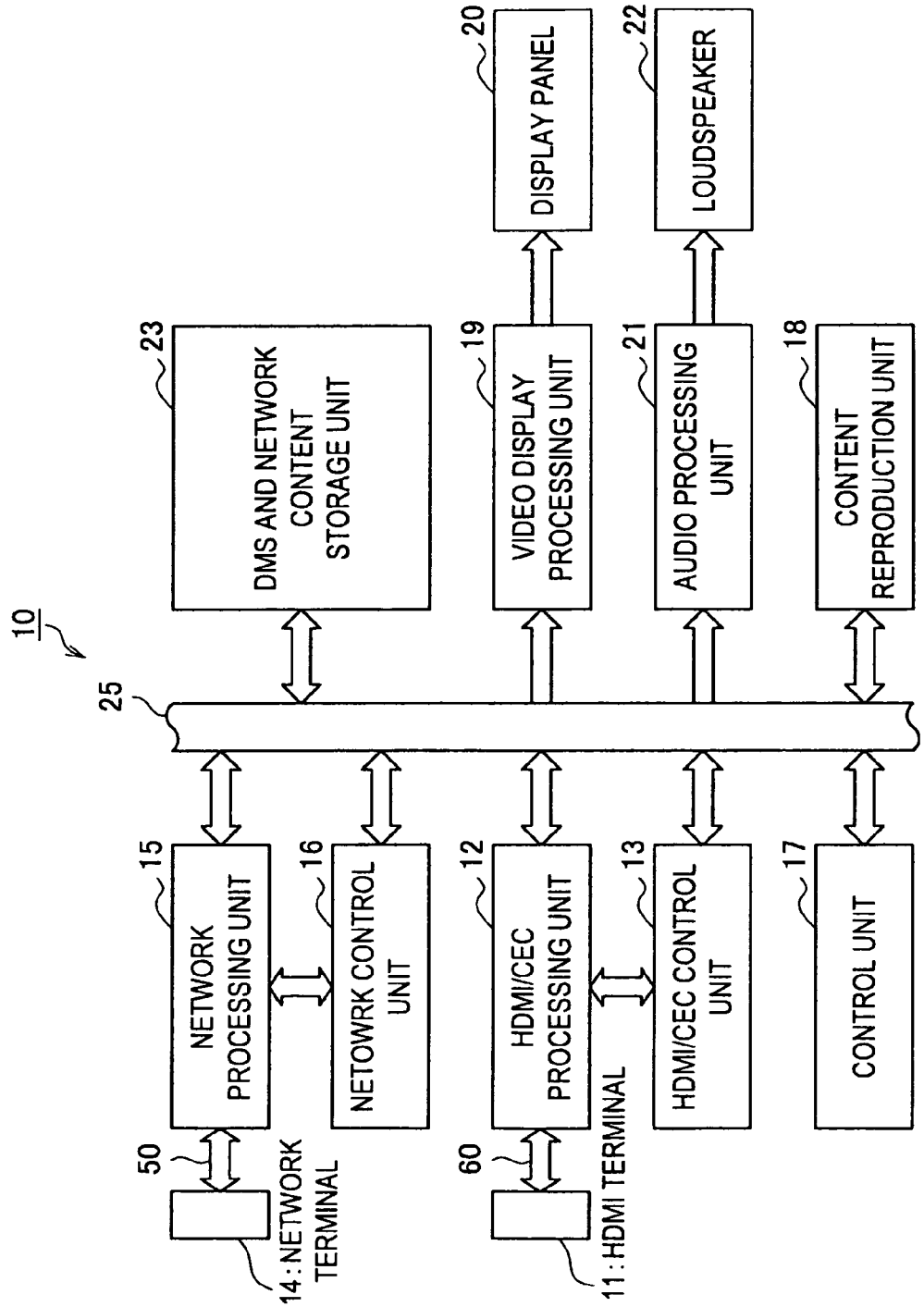
FIG. 2 is a diagram showing an internal configuration of a display device (DMP) in the first embodiment.

In this embodiment, the function of the control unit 17 is partially different from that in the internal configuration of the first display device 10 shown in FIG. 2.

When it is determined that the reproduction device that reproduces content selected by a user is a device capable of transmission and reception using the HDMI cable 60, the control unit 17 automatically switches an input of the first display device 10, and requests reproduction of the content selected by the user to the first reproduction device 30.

When it is determined that the reproduction device that reproduces the content selected by the user is not a device capable of transmission and reception using the HDMI cable 60, the control unit 17 sends out the reproduction request of the content selected by the user to the LAN 50.

When the content selected by the user is output from the first reproduction device 30 in response to the reproduction request of the content, the control unit 17 determines whether or not the first reproduction device 30 is a device capable of transmission and reception using the HDMI cable 60. When it is determined that the first reproduction device 30 is the device capable of transmission and reception using the HDMI cable 60, the control unit 17 receives and displays the content output through the HDMI cable 60. When it is determined that the first reproduction device 30 is not the device capable of transmission and reception using the HDMI cable 60, the control unit 17 receives the output content through the LAN 50 and displays the output content after converted to predetermined data.

[Operation of Display Device (DMP)]

Figure 10:
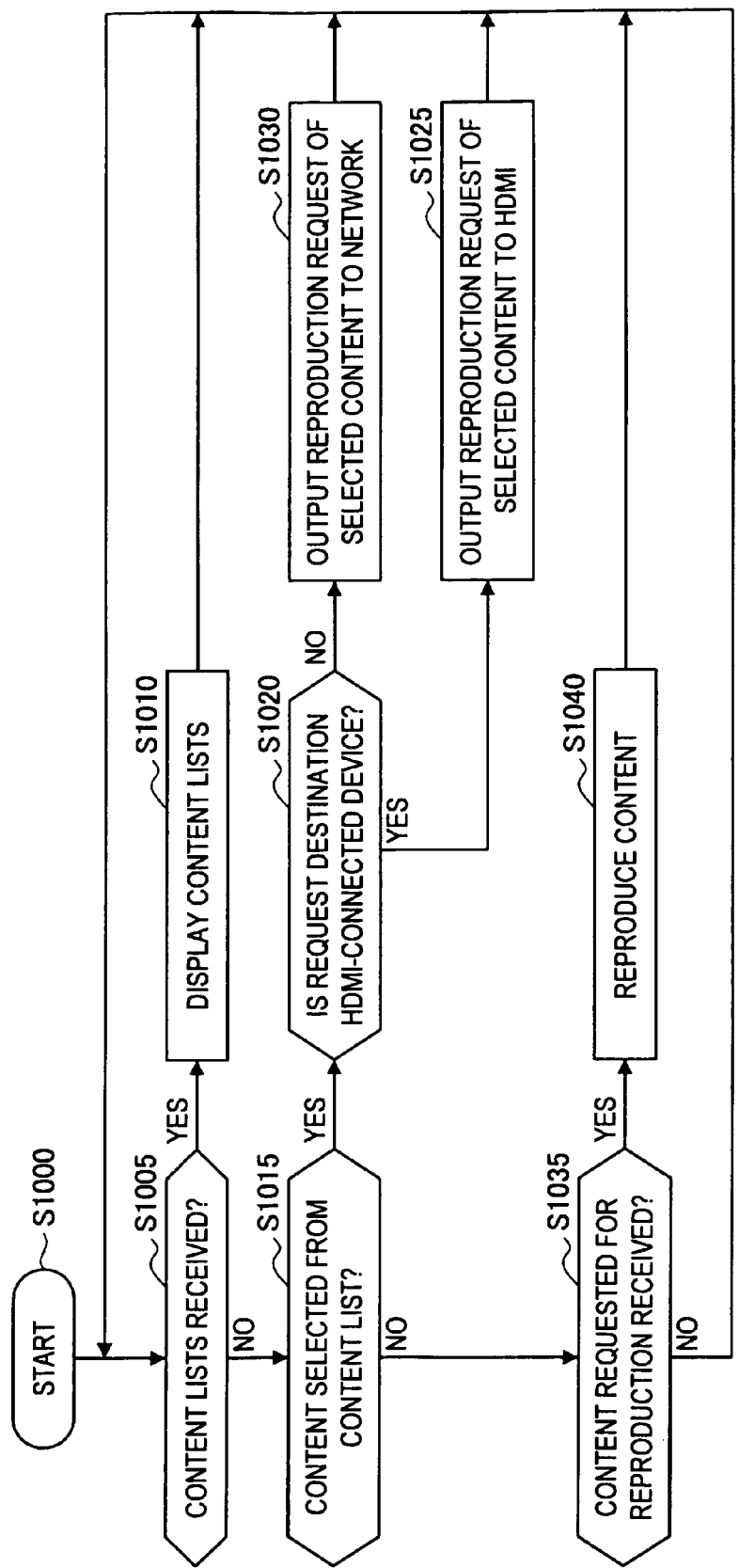
FIG. 10 is a flowchart showing processes of a display device in a second embodiment.

Next, an operation of the first display device 10 as the display device (DMP) in the second embodiment will be described, with reference to a flowchart shown in FIG. 10.

The operation of the first display device 10 is started from step S1000. The operation then proceeds to step S1005, in which the first display device 10 determines whether or not the first display device 10 has received content lists. When it is determined that the first display device 10 has received the content lists, the first display device 10 displays the content lists on the display panel 20 in step S1010.

When it is determined in step S1005 that the first display device 10 has not received the content lists, the operation proceeds to step S1015. Then, the first display device 10 determines which one of contents has been selected from the content list by a user operation. When it is determined that the content has been selected, the first display device 10 determines whether or not the reproduction device of a request destination is the HDMI-connected device, in step S1020. When it is determined that the reproduction device of the request destination is the HDMI-connected device, connection is automatically switched to the HDMI connection and then, the first display device 10 outputs the reproduction request of the selected content to the HDMI cable 60, in step S1025. On the other hand, when it is determined that the reproduction device of the request destination is not the HDMI-connected device in step S1020, the first reproduction device 30 outputs the content which has been requested for reproduction in step S1030 to the network (LAN 50).

When it is determined that the content has not been selected in step S1015, the first display device 10 determines whether or not the first display device 10 has received content requested for reproduction in step S1035. When it is determined that the first display device 10 has received the content, the operation proceeds to step S1040, and the first display device 10 reproduces the received content.

[Operation of Reproduction Device (DMS)]

Figure 11:
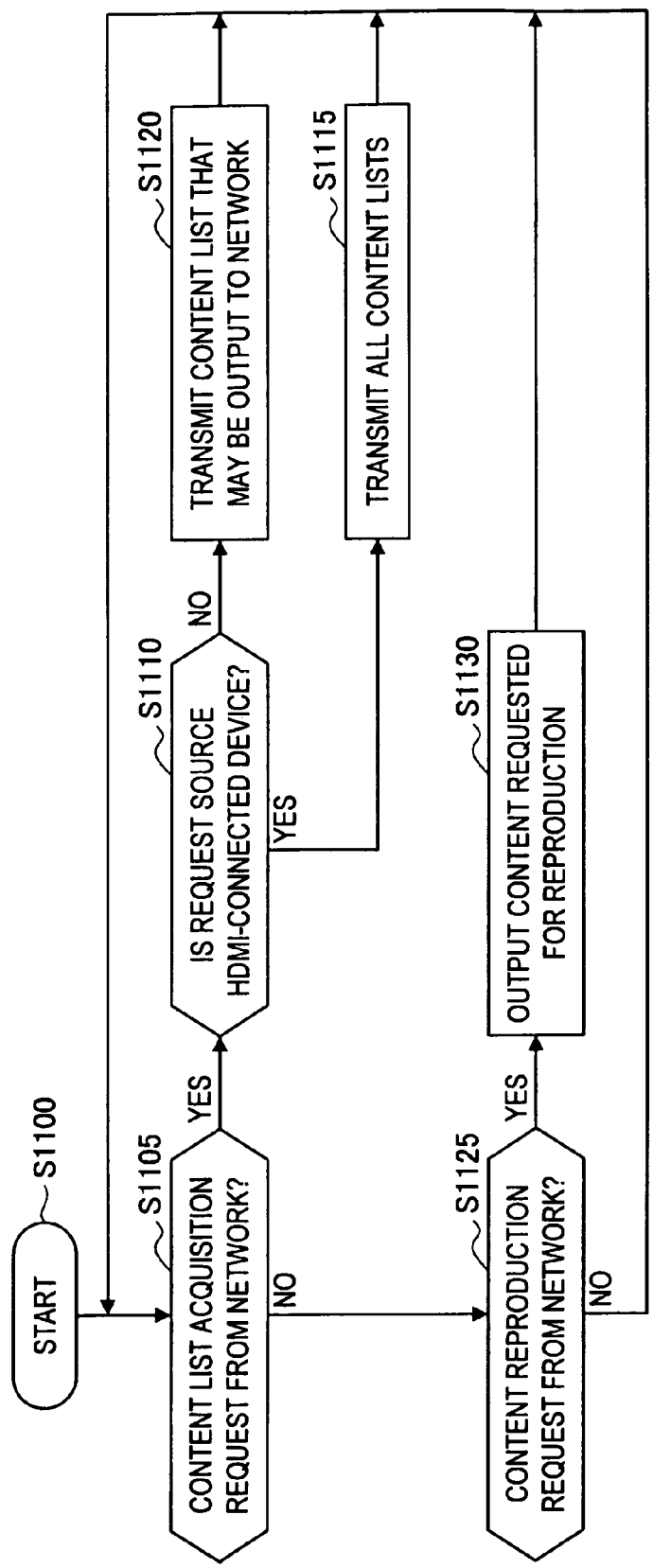
FIG. 11 is a flowchart showing processes of a reproduction device in the second embodiment.

Next, an operation of the first reproduction device 30 as the reproduction device (DMS) in the second embodiment will be described with reference to a flowchart shown in FIG. 11.

The operation of the first reproduction device 30 is started from step S1100. Since processes in steps S1105 to S1120 that are executed by the first reproduction device 30 are the same as the processes in steps S605 to S620 in FIG. 6 that are executed by the first reproduction device 30, description of the processes in steps S1105 to S1120 will be omitted.

The first reproduction device 30 determines whether or not a content reproduction request has been made from the network in step S1125. When it is determined that the content reproduction request has been made, the operation proceeds to step S1130. The first reproduction device 30 outputs content which has been requested for reproduction.

As described above, in the transmission system 100 in the second embodiment, list display of all content lists including contents which may be reproduced by the reproduction device may be displayed on the display device, irrespective of a content transmission path. In the transmission system 100 in the second embodiment, content may be reproduced without needing a special input switching operation or an operation on the reproduction device.

With no HDMI connection device associated with the storage unit of one of the display device or the reproduction device, this embodiment does not function.

As described above, according to the transmission system 100 in each of the first and second embodiments, by employing two systems of communication means which are the DLNA and the HDMI-CEC, display of a content list which cannot be displayed through the (DLNA) network alone and content reproduction may be implemented by an operation from the display device without worrying about a content transmission path. Further, the CEC pass-through command may be used. Thus, reproduction control which cannot be operated by the (DLNA) network is allowed. With these arrangements, all operations may be performed using just one remote controller on the side of the display device such as the television. The need for the user to further use the remote controller of the reproduction device to perform the operations is therefore eliminated.

In the first to second embodiments described above, operations of the respective units are associated with one another and may be replaced with a sequence of operations and a sequence of processes, with the mutual association being taken into consideration. The embodiments of the display apparatus may be thereby regarded as an embodiment of a transmission method and an embodiment of a program for causing a computer to implement a function of the transmission system.

With this arrangement, there may be provided a transmission method in which reproduction devices and display devices mutually transmit and receive content through a network, each reproduction device reproducing the content, each display device displaying the content, the method including the steps of: storing identification information on one or more of the display devices capable of transmitting and receiving a signal using communication means different from the network; storing content lists provided from the reproduction device in a content list storage unit; storing identification information on one or more of the reproduction devices capable of transmitting and receiving the signal using the communication means; and transmitting the content lists stored in the content list storage unit to the display device when the display device which displays a content list requested by a user is determined to be a device capable of transmission and reception using the communication means, based on at least one of the reproduction device identification information stored in the display device storage unit and the display device identification information stored in the reproduction device storage unit.

Further, with this arrangement, there may be provided a program for a transmission method in which reproduction devices and display devices mutually transmit and receive content through a network, each reproduction device reproducing the content, each display device displaying the content, the program causing a computer to execute the processes of: storing identification information on one or more of the display devices capable of transmitting and receiving a signal using communication means different from the network; storing content lists provided from the reproduction device in a content list storage unit; storing identification information on one or more of the reproduction devices capable of transmitting and receiving the signal using the communication means; and transmitting the content lists stored in the content list storage unit to the display device when the display device which displays a content list requested by a user is determined to be a device capable of transmission and reception using the communication means, based on at least one of the reproduction device identification information stored in the display device storage unit and the display device identification information stored in the reproduction device storage unit.

It should be understood by those skilled in the art that various modifications, combinations, sub-combinations and alterations may occur depending on design requirements and other factors insofar as they are within the scope of the appended claims or the equivalents thereof.

In the above-mentioned embodiments, for example, the DMS is set to the reproduction device. The present invention, however, is not limited to such an example. The reproduction device may include a broadcasting receiving device, for example. By sending a list of reception channels as content lists by the broadcasting receiving device, the display device may simultaneously perform list display of reception channels of the display device and the reception channels of the broadcasting receiving device. Then, when one of the reception channels of the broadcasting receiving device is selected, an input is automatically switched to the broadcasting receiving device from the display device. The remote controller of the display device may be operated by the network (which conforms to the DLNA specifications) and the HDMI cable (which conforms to the HDMI standard). Thus, operability comparable to that when viewing and listening to the reception channel of the display device may be obtained.

The display device according to the present invention displays all contents in content lists obtained from the DMS (reproduction device) which is the HDMI-connected device, even if the content list includes content that cannot be displayed by the display device. At that time of display of all the contents, it may be so arranged that the display device according to the present invention does not display in the content lists obtained from the DMS the content which cannot be displayed by the display device or cannot be dealt with by the content reproduction unit in FIG. 2. Alternatively, it may be so arranged that the display device according to the present invention explicitly shows (by graying out, or the like, for example) that the content cannot be displayed.

The steps described in the flowcharts in this specification include not only the processes that are executed in time series according to the order of description, but also the processes which are executed in parallel or individually even if the processes are not necessarily processed in time series. Even in the steps which are processed in time series, the order of the steps may be changed as necessary, according to the circumstances.

What is claimed is:

1. A transmission system where reproduction devices and display devipces may mutually transmit and receive content through a network, each reproduction device reproducing the content, each display device displaying the content, wherein the reproduction device includes:
a display device storage unit which stores (i) identification information of the display devices capable of transmitting and receiving a signal using communication means different from the network and (ii) identification information of the display devices capable of transmitting and receiving a signal using the network; and
a content list storage unit which stores content lists provided from the reproduction device;
the display device includes:
a reproduction device storage unit which stores (i) identification information of the reproduction devices capable of transmitting and receiving a signal using the communication means and (ii) identification information of the reproduction devices capable of transmitting and receiving a signal using the network;
in which the communication means transmits and receives the signal using an HDMI (high-definition multimedia interface) cable based on a HDMI standard and the network conforms to a digital living network alliance (DLNA) specification which is different from that of the HDMI standard,
in which when the display device which displays a content list requested by a user is determined to be a device capable of transmission and reception using the communication means, based on at least one of the reproduction device identification information stored in the display device storage unit and the display device identification information stored in the reproduction device storage unit, the reproduction device transmits all of the content lists stored in the content list storage unit to the display device by way of the HDMI cable,
in which when the display device that displays the content list requested by the user is determined not to be the device capable of transmission and reception using the communication means, based on at least one of the reproduction device identification information stored in the display device storage unit and the display device identification information stored in the reproduction device storage unit, the reproduction device transmits only the content list or lists capable of being sent out according to the DLNA specification from all of the content lists stored in the respective content list storage unit to the display device by way of the network, in which the display device has a digital media player (DMP) function in accordance with the DLNA specification so as to be a DMP display device, a respective one of the reproduction devices has a digital media server (DMS) function in accordance with the DLNA specification and is connected to the DMP display device by the DLNA network and is not connected to the DMP display device by the HDMI cable so as to be a first DMS reproduction device, and another respective one of the reproduction devices is connected to the DMP display device by the HDMI cable so as to be a second reproduction device, and in which a first content list from the first DMS reproduction device is displayable on the DMP display device simultaneously with a second content list from the second reproduction device without the user having to perform a switching operation involving an input to the DMP display device.

2. The transmission system according to claim 1, wherein when the display device which displays content selected by the user is determined to be the device capable of transmission and reception using the communication means, an input of the display device is automatically switched, and the reproduction device reproduces the selected content and displays the selected content on the display device, using the communication means.

3. The transmission system according to claim 2, wherein when the display device which displays the content selected by the user is determined not to be the device capable of transmission and reception using the communication means, the reproduction device sends out the selected content to the network.

4. The transmission system according to claim 1, wherein when the reproduction device which reproduces content selected by the user is determined to be the device capable of transmission and reception using the communication means, an input of the display device is automatically switched, and the display device requests reproduction of the selected content to the reproduction device.

5. The transmission system according to claim 4, wherein when the reproduction device which reproduces the content selected by the user is determined not to be the device capable of transmission and reception using the communication means, the display device sends out a request for reproduction of the selected content to the network.

6. The transmission system according to claim 5, wherein the reproduction device outputs the selected content in response to a request for reproduction of the selected content; and when the reproduction device is determined to be the device capable of transmission and reception using the communication means, the display device displays the output content while receiving the output content through the communication means, and when the reproduction device is determined not to be the device capable of transmission and reception using the communication means, the display device receives the output content through the network, converts the output content by a predetermined data conversion, and displays the converted output content.

7. The transmission system according to claim 1, wherein the second reproduction device has the DMS function.

8. The transmission system according to claim 1, wherein the content list or lists are not stored in the storage unit of the display device.

9. A transmission method in which reproduction devices and display devices mutually transmit and receive content through a network, each reproduction device reproducing the content, each display device displaying the content, the method comprising the steps of:

storing (i) identification information of the display devices capable of transmitting and receiving a signal using communication means different from the network and (ii) identification information of the display devices capable of transmitting and receiving a signal using the network;

storing content lists provided from the reproduction device in a content list storage unit;

storing (i) identification information on one or more of the reproduction devices capable of transmitting and receiving the signal using the communication means and (ii) identification information of the reproduction devices capable of transmitting and receiving a signal using the network;

in which the communication means transmits and receives the signal using an HDMI (high-definition multimedia interface) cable based on a HDMI standard and the network conforms to a digital living network alliance (DLNA) specification which is different from that of the HDMI standard, and further comprising:

transmitting all of the content lists stored in the content list storage unit to the display device by way of the HDMI cable when the display device which displays a content list requested by a user is determined to be a device capable of transmission and reception using the communication means, based on at least one of the stored reproduction device identification information and the stored display device identification information; and transmitting only the content list or lists capable of being sent out according to the DLNA specification from all of the content lists stored in the content list storage unit to the display device by way of the network when the display device that displays the content list requested by the user is determined not to be the device capable of transmission and reception using the communication means, based on the stored reproduction device identification information, in which the display device has a digital media player (DMP) function in accordance with the DLNA specification so as to be a DMP display device, a respective one of the reproduction devices has a digital media server (DMS) function in accordance with the DLNA specification and is connected to the DMP display device by the DLNA network and is not connected to the DMP display device by the HDMI cable so as to be a first DMS reproduction device, and another respective one of the reproduction devices is connected to the DMP display device by the HDMI cable so as to be a second reproduction device, and in which a first content list from the first DMS reproduction device is displayable on the DMP display device simultaneously with a second content list from the second reproduction device without the user having to perform a switching operation involving an input to the DMP display device.

10. A non-transitory computer readable medium having stored thereon a program for a transmission method in which reproduction devices and display devices mutually transmit and receive content through a network, each reproduction device reproducing the content, each display device displaying the content, the program causing a computer to execute the processes of:
  storing (i) identification information of the display devices capable of transmitting and receiving a signal using communication means different from the network and (ii) identification information of the display devices capable of transmitting and receiving a signal using the network;
  storing content lists provided from the reproduction device in a content list storage unit;
  storing (i) identification information on one or more of the reproduction devices capable of transmitting and receiving the signal using the communication means and (ii) identification information of the reproduction devices capable of transmitting and receiving a signal using the network;
  in which the communication means transmits and receives the signal using an HDMI (high-definition multimedia interface) cable based on a HDMI standard and the network conforms to a digital living network alliance (DLNA) specification which is different from that of the HDMI standard,
  and further comprising:
  transmitting all of the content lists stored in the content list storage unit to the display device by way of the HDMI cable when the display device which displays a content list requested by a user is determined to be a device capable of transmission and reception using the communication means, based on at least one of the stored reproduction device identification information and the stored display device identification information; and
  transmitting only the content list or lists capable of being sent out according to the DLNA specification from all of the content lists stored in the content list storage unit to the display device by way of the network when the display device that displays the content list requested by the user is determined not to be the device capable of transmission and reception using the communication means, based on the stored reproduction device identification information,
  in which the display device has a digital media player (DMP) function in accordance with the DLNA specification so as to be a DMP display device, a respective one of the reproduction devices has a digital media server (DMS) function in accordance with the DLNA specification and is connected to the DMP display device by the DLNA network and is not connected to the DMP display device by the HDMI cable so as to be a first DMS reproduction device, and another respective one of the reproduction devices is connected to the DMP display device by the HDMI cable so as to be a second reproduction device, and
  in which a first content list from the first DMS reproduction device is displayable on the DMP display device simultaneously with a second content list from the second reproduction device without the user having to perform a switching operation involving an input to the DMP display device.

11. A transmission system comprising:
  a number of display devices and a plurality of reproduction devices each connectable to a network,
  in which each reproduction device includes (i) a display device storage unit which stores identification information of each display device capable of transmitting and receiving a signal using a predetermined transmission path different from the network and stores identification information of the display devices capable of transmitting and receiving a signal using the network, and (ii) a content list storage unit which stores content lists,
  in which each display device includes a reproduction device storage unit which stores (i) identification information of each reproduction device capable of transmitting and receiving a signal using the predetermined transmission path and (ii) identification information of the reproduction devices capable of transmitting and receiving a signal using the network,
  in which the predetermined transmission path is an HDMI (high-definition multimedia interface) cable based on a HDMI standard and the network conforms to a digital living network alliance (DLNA) specification which is different from that of the HDMI standard,
  in which when a respective display device is determined to be capable of transmission and reception using the predetermined transmission path with a respective reproduction device based on at least one of reproduction device identification information stored in the respective display device storage unit or the display device identification information stored in the respective reproduction device storage unit, the respective reproduction device transmits all content lists stored in the respective content list storage unit to the respective display device by way of the predetermined transmission path,
  in which when the respective display device is determined to be not capable of transmission and reception using the predetermined transmission path with the respective reproduction device based on at least one of the reproduction device identification information stored in the respective display device storage unit or the display device identification information stored in the respective reproduction device storage unit, the respective reproduction device transmits only the content list or lists capable of being sent out according to the DLNA specification from all of the content lists stored in the respective content list storage unit to the respective display device by way of the network,
  in which the respective display device has a digital media player (DMP) function in accordance with the DLNA specification so as to be a DMP display device, a first one of the reproduction devices has a digital media server (DMS) function in accordance with the DLNA specification and is connected to the DMP display device by the DLNA network and is not connected to the DMP display device by the HDMI cable so as to be a first DMS reproduction device, and second one of the reproduction devices is connected to the DMP display device by the HDMI cable so as to be a second reproduction device, and
  in which a first content list from the first DMS reproduction device is displayable on the DMP display device simultaneously with a second content list from the second reproduction device without the user having to perform a switching operation involving an input to the DMP display device.

* * * * *